United States Patent
Yang et al.

(10) Patent No.: US 9,328,277 B2
(45) Date of Patent: May 3, 2016

(54) HEAT TRANSFER FLUIDS AND CORROSION INHIBITOR FORMULATIONS FOR USE THEREOF

(71) Applicant: Prestone Products Corporation, Lake Forest, IL (US)

(72) Inventors: Bo Yang, Ridgefield, CT (US); Aleksei Gershun, Southbury, CT (US); Peter M. Woyciesjes, Woodbury, CT (US)

(73) Assignee: Prestone Products Corporation, Lake Forest, IL (US)

( * ) Notice: Subject to any disclaimer, the term of this patent is extended or adjusted under 35 U.S.C. 154(b) by 0 days.

(21) Appl. No.: 14/083,123

(22) Filed: Nov. 18, 2013

(65) Prior Publication Data

US 2014/0119982 A1  May 1, 2014

Related U.S. Application Data

(63) Continuation of application No. 13/606,516, filed on Sep. 7, 2012, now Pat. No. 8,613,866.

(51) Int. Cl.
| | |
|---|---|
| *C09K 5/10* | (2006.01) |
| *C09K 5/20* | (2006.01) |
| *C23F 11/08* | (2006.01) |
| *C23F 11/18* | (2006.01) |

(52) U.S. Cl.
CPC ... *C09K 5/10* (2013.01); *C09K 5/20* (2013.01); *C23F 11/08* (2013.01); *C23F 11/18* (2013.01); *C23F 11/187* (2013.01)

(58) Field of Classification Search
None
See application file for complete search history.

(56) References Cited

U.S. PATENT DOCUMENTS

| | | |
|---|---|---|
| 3,198,820 A | 8/1965 | Pines et al. |
| 3,203,969 A | 8/1965 | Pines et al. |
| 3,248,329 A | 4/1966 | Pines et al. |
| 3,312,622 A | 4/1967 | Pines et al. |
| 3,337,496 A | 8/1967 | Pines et al. |
| 3,341,469 A | 9/1967 | Pines et al. |
| 4,093,641 A | 6/1978 | Plueddemann |
| 4,287,077 A | 9/1981 | Wing |
| 4,333,843 A | 6/1982 | Wing et al. |
| 4,352,742 A | 10/1982 | Davis et al. |
| 4,354,002 A | 10/1982 | Davis et al. |
| 4,362,644 A | 12/1982 | Davis et al. |
| 4,370,255 A | 1/1983 | Plueddemann |
| 4,517,110 A | 5/1985 | Suzuki et al. |
| 4,629,602 A | 12/1986 | Gousetis et al. |
| 4,701,277 A | 10/1987 | Mohr et al. |
| 4,772,408 A | 9/1988 | Mohr et al. |
| 5,018,577 A | 5/1991 | Pardue et al. |
| 5,338,477 A | 8/1994 | Chen et al. |
| 5,606,105 A | 2/1997 | Davis et al. |
| 5,866,042 A | 2/1999 | Chen |
| 6,126,852 A * | 10/2000 | Turcotte et al. ............ 252/76 |
| 6,235,217 B1 | 5/2001 | Turcotte et al. |
| 6,391,257 B1 | 5/2002 | Woyciesjes |
| 6,572,789 B1 | 6/2003 | Yang et al. |
| 7,608,198 B2 | 10/2009 | Jeffcoate |
| 7,645,331 B2 | 1/2010 | Yang |
| 7,662,304 B2 | 2/2010 | Woyciesjes |
| 7,820,066 B2 | 10/2010 | Jeffcoate |
| 7,854,253 B2 | 12/2010 | Woyciesjes |
| 7,985,349 B2 | 7/2011 | Yang |
| 8,216,383 B2 | 7/2012 | Yang |
| 2004/0227124 A1 | 11/2004 | Turcotte et al. |
| 2006/0017044 A1 | 1/2006 | Zhang et al. |
| 2007/0034825 A1 | 2/2007 | Wenderoth |
| 2009/0266519 A1 | 10/2009 | Marinho |
| 2009/0294102 A1 | 12/2009 | Yang |
| 2010/0006796 A1 | 1/2010 | Yang |
| 2010/0059703 A1* | 3/2010 | Yang et al. ............... 252/76 |
| 2010/0116473 A1* | 5/2010 | Yang et al. ............ 165/134.1 |

FOREIGN PATENT DOCUMENTS

| | | |
|---|---|---|
| EP | 0245557 | 11/1987 |
| EP | 0902074 | 3/1999 |
| KR | 20100018754 | 2/2010 |
| WO | WO 2006029326 | 3/2006 |
| WO | WO 2006135414 | 12/2006 |
| WO | WO 2007050568 | 5/2007 |
| WO | WO 2009111443 | 9/2009 |
| WO | WO 2010006256 | 1/2010 |
| WO | WO 2010054224 | 5/2010 |

OTHER PUBLICATIONS

Non-final Office Action dated Mar. 15, 2013 in U.S. Appl. No. 13/606,516.
Non-final Office Action dated Mar. 15, 2013 in U.S. Appl. No. 13/606,452.
International Search Report and Written Opinion of PCT/US2013/56267 dated Sep. 13, 2013.
International Search Report and Written Opinion of PCT/US2013/56262 dated Oct. 16, 2013.
International Search Report and Written Opinion of PCT/US2013/56268 dated Sep. 19, 2013.
Non-final Office Action dated May 22, 2014 in U.S. Appl. No. 14/083,092.
Extended European Search Report, Appl. No. 13834450.2 dated Mar. 17, 2016.

* cited by examiner

*Primary Examiner* — Necholus Ogden, Jr.
(74) *Attorney, Agent, or Firm* — Gregory H. Zayia; Barnes & Thornburg LLP

(57) ABSTRACT

Disclosed herein is a heat transfer fluid concentrate comprising: greater than or equal to 85 weight percent of a freezing point depressant, based on the total weight of the heat transfer fluid concentrate; 50 to 2000 ppm of lithium ions; an azole compound; an inorganic phosphate; a carboxylic acid; and an acrylate based polymer, wherein the heat transfer fluid has a pH of 7.0-9.5. The heat transfer fluid concentrate can be used to make a heat transfer fluid.

25 Claims, No Drawings

HEAT TRANSFER FLUIDS AND CORROSION INHIBITOR FORMULATIONS FOR USE THEREOF

The present application is a continuation of U.S. patent application Ser. No. 13/606,516, now U.S. Pat. No. 8,613,866, filed Sep. 7, 2012, the entire contents of which is hereby incorporated by reference.

BACKGROUND

Modern vehicle engines generally require a heat transfer fluid (liquid coolant) to provide long-lasting, year-round protection of their cooling systems. The primary requirements of the heat transfer fluids are that they provide efficient heat transfer to control and maintain engine temperature for efficient fuel economy and lubrication, and prevent engine failures due to freeze-up, boiling-over, or over-heating. An additional key requirement of a heat transfer fluid is that it provides corrosion protection of all cooling system metals over a wide range of temperature and operating conditions. Aluminum corrosion protection is particularly important. Beyond metal protection, corrosion protection helps the heat transfer fluid to fulfill its primary function of transferring excess heat from the engine to the radiator for dissipation.

There is an ongoing need for heat transfer fluids having good fast and/or extended corrosion protection.

BRIEF DESCRIPTION

This need is met, at least in part, by a heat transfer fluid concentrate comprising: greater than or equal to 85 weight percent of a freezing point depressant; 50 to 2000 ppm of lithium ions; an azole compound; an inorganic phosphate; a carboxylic acid; and 400 to 1000 ppm of an acrylate based polymer, wherein the heat transfer fluid concentrate has a pH of 7.0 to 9.5 and the weight percent and the ppm are based on the total weight of the heat transfer fluid concentrate.

The heat transfer fluid concentrate can be diluted to form a heat transfer fluid comprising: less than 90 weight percent of a freezing point depressant; water; 40 to 1600 ppm of lithium ions; an azole compound; an inorganic phosphate; a carboxylic acid; greater than 0.5 ppm of calcium ions; and 300 to 900 ppm of an acrylate based polymer, wherein the heat transfer fluid has a pH of 7.0 to 9.5 and the weight percent and the ppm are based on the total weight of the heat transfer fluid.

Also described herein is a heat transfer system comprising a heat transfer fluid as described herein and a heat transfer apparatus.

DETAILED DESCRIPTION

Disclosed herein are heat transfer fluid concentrate and heat transfer fluid compositions that demonstrate a synergistic effect between the components of the composition. Corrosion protection is unexpectedly improved when magnesium ions are included in the heat transfer fluid or heat transfer fluid concentrate.

The heat transfer fluid concentrate and heat transfer fluid can be free of silicate, borate and amines. The nitrate content can be less than 50 ppm by weight based on the total weight of the heat transfer fluid.

The freezing point depressant can be an alcohol or mixture of alcohols. Exemplary alcohols include monohydric or polyhydric alcohols and mixtures thereof. The alcohol can be selected from the group consisting of methanol, ethanol, propanol, butanol, furfurol, furfuryl alcohol, tetrahydrofurfuryl alcohol, ethoxylated furfuryl alcohol, ethylene glycol, propylene glycol, 1,3-propanediol, glycerol, diethylene glycol, triethylene glycol, 1,2-propylene glycol, 1,3-propylene glycol, dipropylene glycol, butylene glycol, glycerol-1,2-dimethyl ether, glycerol-1,3-dimethyl ether, monoethylether of glycerol, sorbitol, 1,2,6-hexanetriol, trimethylopropane, alkoxy alkanols, such as methoxyethanol, and combinations of two or more of the foregoing.

In the heat transfer fluid concentrate the freezing point depressant is present in an amount greater than or equal to 85 weight percent (wt %) and less than or equal to 99 wt %, based on the total weight of the heat transfer fluid concentrate. Within this range, the amount of freezing point concentrate can be greater than or equal to 86 wt %, greater than or equal to 87 wt %, greater than or equal to 88 wt %, greater than or equal to 89 wt %, greater than or equal to 90 wt %, greater than or equal to 91 wt %, greater than or equal to 92 wt %, greater than or equal to 93 wt %, greater than or equal to 94 wt %, greater than or equal to 95 wt %, greater than or equal to 96 wt %, greater than or equal to 97 wt %, or greater than or equal to 98 wt %.

The carboxylic acid, salt thereof or combination of the foregoing (collectively referred to sometimes herein as the carboxylate) has 6 to 20 carbon atoms. The carboxylate may comprise a single or multiple carboxyl groups and may be linear or branched. It is expressly contemplated that combinations of carboxylates may be used and may be encompassed by the term "carboxylate" or "carboxylic acid". Exemplary aliphatic carboxylates include 2-ethyl hexanoic acid, hexanoic acid, heptanoic acid, octanoic acid, neodecanoic acid, decanoic acid, nonanoic acid, isoheptanoic acid, dodecanoic acid, sebacic acid, adipic acid, pimelic acid, suberic acid, azelaic acid, dodecanedioic acid, and combinations of two or more of the foregoing. Exemplary aromatic carboxylates include benzoic acid, toluic acid or methylbenzoic acid, tert-butyl benzoic acid, alkoxy benzoic acid, e.g., methoxybenzoic acid (or o, p, m-anisic acid), salicylic acid, phthalic acid, isophthalic acid, terephthalic acid, phenylacetic acid, mandelic acid, 1,2,4-benzenetricarboxylic acid, and their sodium or potassium salts.

In the heat transfer fluid concentrate, the carboxylate is present in an amount of about 1 to about 10 wt %, based on the total weight of the heat transfer fluid concentrate. Within this range, the amount can be greater than or equal to about 1.1 wt %, or, more specifically, greater than or equal to about 1.2 wt %. Also within this range, the amount can be less than or equal to about 9 wt %, or, more specifically, less than or equal to about 8 wt %.

The inorganic phosphate can comprise phosphoric acid, sodium orthophosphate, potassium orthophosphate, sodium pyrophosphate, potassium pyrophosphate, sodium polyphosphate, potassium polyphosphate, sodium hexametaphosphate, potassium hexametaphosphate, or a combination of two or more of the foregoing inorganic phosphates.

In the heat transfer fluid concentrate, the inorganic phosphate is present in an amount of about 0.10 to about 0.60 weight percent, based on the total weight of the heat transfer fluid concentrate. Within this range the amount can be greater than or equal to about 0.11 wt %, or, more specifically, greater than or equal to about 0.12 wt %. Also within this range the amount can be less than or equal to about 0.45 wt %, or, more specifically, less than or equal to about 0.40 wt %.

The heat transfer fluid concentrate comprises an azole. Exemplary azoles include benzotriazole, tolyltriazole, methyl benzotriazole (e.g., 4-methyl benzotriazole and 5-methyl benzotriazole), tetrahydrotolytriazole, butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole and substituted tetrazoles. Combinations of two or more of the foregoing azoles may also be used and combinations of azoles are included in the term "azole".

In the heat transfer fluid concentrate, the azole compound is present in an amount of about 0.01 wt % to about 3 wt %, based on the total weight of the heat transfer fluid concentrate. Within this range, the azole compound can be present in an amount greater than or equal to about 0.05 wt %, or, more specifically, greater than or equal to about 0.1 wt %. Also within this range, the azole compound can be present in an amount less than or equal to about 2 wt %, or, more specifically, less than or equal to about 1 wt %.

The lithium ions are derived from a lithium compound or compounds that can produce lithium ions upon dissolving in a water containing solution at room temperature. The lithium compound can be an inorganic lithium compound such as lithium hydroxide, lithium phosphate, lithium borate, lithium nitrate, lithium perchlorate, lithium sulfate, lithium molybdate, lithium vanadate, lithium tungstate, lithium carbonate or a combination thereof. The lithium compound is soluble in the heat transfer fluid. Soluble, as used herein, is defined as dissolving such that no particulate matter is visible to the naked eye. The lithium compound can also be lithium salt formed between lithium ions and an organic acid containing one or more carboxylic acid groups, such as lithium acetate, lithium benzoate, lithium polyacrylate, lithium polymaleate, lithium lactate, lithium citrate, lithium tartrate, lithium gluconate, lithium glucoheptonate, lithium glycolate, lithium glucarate, lithium succinate, lithium hydroxyl succinate, lithium adipate, lithium oxalate, lithium malonate, lithium sulfamate, lithium formate, lithium propionate, lithium salt of aliphatic mono-, di- or tri-carboxylic acid or aromatic mono-, di- or tri-carboxylic acid, and combinations of the foregoing lithium compounds.

The lithium compound or compounds can be present in an amount such that the heat transfer fluid concentrate has a lithium ion concentration of 50 to 2000 parts per million by weight (ppm) of the heat transfer fluid. Within this range, the lithium ion concentration can be less than or equal to about 1900 ppm, or more specifically, less than or equal to about 1800 ppm. Also within this range, the lithium ion concentration can be greater than or equal to about 55 ppm, or more specifically, greater than or equal to about 60 ppm.

The heat transfer fluid comprises an acrylate based polymer or combination of acrylate based polymers. The acrylate based polymer is a water soluble polymer (average molecular weight (MW): 200 to 200,000 Daltons). Exemplary acrylate polymers include polyacrylates, acrylate based polymers, copolymers, terpolymers, and quadpolymers, such as acrylate/acrylamide copolymers, polymethacrylates, polymaleic acids or maleic anhydride polymers, maleic acid based polymers, their copolymers and terpolymers, modified acrylamide based polymers, including polyacrylamides, acrylamide based copolymers and terpolymers. In general, water soluble polymers suitable for use include homo-polymers, copolymers, terpolymer and inter-polymers having (1) at least one monomeric unit containing $C_3$ to $C_{16}$ monoethylenically unsaturated mono- or dicarboxylic acids or their salts; or (2) at least one monomeric unit containing $C_3$ to $C_{16}$ monoethylenically unsaturated mono- or dicarboxylic acid derivatives such as amides, nitriles, carboxylate esters, acid halides (e.g., chloride), and acid anhydrides, and combinations thereof. In some embodiments, the acrylate based polymer comprises a phosphinopolyacrylate.

In the heat transfer fluid concentrate, the acrylate based polymer or combination of acrylate based polymers can be present in an amount of about 100 to about 1000 ppm, based on the total weight of the heat transfer fluid concentrate. Within this range, the acrylate based polymer can be present in an amount greater than or equal to about 150 ppm, or, more specifically, greater than or equal to about 200 ppm. Also within this range, the acrylate based polymer can be present in an amount less than or equal to about 950 ppm, or, more specifically, less than or equal to about 900 ppm. Acrylate based polymers are often commercially available as solutions or dispersions. The amounts referred to in this paragraph relate to the quantity of the polymer or combination of polymers, not the quantity of the solution or dispersion.

The heat transfer fluid concentrate can further comprise magnesium ions. The magnesium ions are derived from a magnesium compound that can produce magnesium ions upon dissolving in a water containing solution at room temperature. The magnesium compound can be an inorganic magnesium compound such as magnesium nitrate, magnesium sulfate, magnesium molybdate, magnesium tungstate, magnesium vanadate, magnesium perchlorate, magnesium hydroxide or a combination thereof. The magnesium compound is soluble in the heat transfer fluid. Soluble, as used herein, is defined as dissolving such that no particulate matter is visible to the naked eye. The magnesium compound can also be magnesium salt formed between magnesium ions and an organic acid containing one or more carboxylic acid groups, such as magnesium polyacrylate, magnesium polymaleate, magnesium lactate, magnesium citrate, magnesium tartrate, magnesium gluconate, magnesium glucoheptonate, magnesium glycolate, magnesium glucarate, magnesium succinate, magnesium hydroxysuccinate, magnesium adipate, magnesium oxalate, magnesium malonate, magnesium sulfamate, magnesium formate, magnesium acetate, magnesium propionate, magnesium salt of aliphatic tri-carboxylic acid or aliphatic tetra-carboxylic acid, and combinations of the foregoing magnesium compounds.

In the heat transfer fluid concentrate, the magnesium compound is present in an amount such that the heat transfer fluid has a magnesium ion concentration of 16 to 80 parts per million by weight (ppm) of the heat transfer fluid concentrate. Within this range, the magnesium ion concentration can be greater than or equal to about 20 ppm, or, more specifically, greater than or equal to about 22 ppm. Also within this range, the magnesium ion concentration can be less than or equal to about 75 ppm, or, more specifically, less than or equal to about 70 ppm.

The heat transfer fluid concentrate can further comprise calcium ions. The calcium ions are derived from a calcium compound that can produce calcium ions upon dissolving in a water containing solution at room temperature. The calcium compound can be an inorganic calcium compound such as calcium nitrate, calcium chloride, calcium perchlorate, calcium molybdate, calcium tungstate, calcium vanadate, calcium hydroxide, or a combination thereof. The calcium compound is soluble in the heat transfer fluid. Soluble, as used herein, is defined as dissolving such that no particulate matter is visible to the naked eye. The calcium compound can also be calcium salt formed between calcium ions and an organic acid containing one or more carboxylic acid groups, such as calcium polyacrylate, calcium polymaleate, calcium lactate, calcium citrate, calcium tartrate, calcium gluconate, calcium glucoheptonate, calcium glycolate, calcium glucarate, calcium succinate, calcium hydroxysuccinate, calcium adipate, calcium oxalate, calcium malonate, calcium sulfamate, calcium formate, calcium acetate, calcium propionate, calcium salts of aliphatic tri-carboxylic acid or aliphatic tetra-carboxylic acid, and combinations of the foregoing calcium compounds.

The calcium compound can be present in an amount such that the heat transfer fluid concentrate has a calcium ion concentration of greater than 0.5 parts per million, based on the total weight of the heat transfer fluid. Within this range, the amount of calcium ions can be less than 20 ppm. Also within this range, the amount of calcium ions can be less than or equal to 10 ppm.

The pH of the heat transfer fluid concentrate is 7.0 to 9.5 at room temperature. Within this range, the pH can be greater than or equal to 7.5, or, greater than or equal to 7.8. Also within this range, the pH can be less than or equal to 9.0, or, less than or equal to 8.8.

The heat transfer fluid concentrate can further comprise a phosphonocarboxylate. Phosphonocarboxylates are phosphonated compounds having the general formula $$H[CHRCHR]_n\text{—}PO_3M_2$$

wherein at least one R group in each unit is a COOM, $CH_2OH$, sulphono or phosphono group and the other R group which may be the same as, or different from, the first R group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, n is 1 or an integer greater than 1, and each M is hydrogen or an alkali metal ion such as a sodium ion, potassium ion and the like. Furthermore, at least one COOM group will be present in one of the R groups. Preferably, the phosphonocarboxylates are phosphonated oligomers or mixture of phosphonated oligomers of maleic acid, of the formula $H[CH(COOM)CH(COOM)]_n$, $\text{—}PO_3M_2$, where n is 1 or an integer greater than 1, and M is a cationic species (e.g., alkali metal cations) such that the compound is water soluble. Exemplary phosphonocarboxylates include phosphonosuccinic acid, 1-phosphono-1,2,3,4-tetracarboxybutane, and 1-phosphono-1,2,3,4,5,6-hexacarboxyhexane. The phosphonocarboxylates can be a mixture of compounds having the preceding formula with differing values for "n". The mean value of "n" can be 1 to 2, or, more specifically, 1.3 to 1.5. The synthesis of the phosphonocarboxylates is known and described in U.S. Pat. No. 5,606,105. The phosphonocarboxylates are separate and different from the carboxylic acids described above. The carboxylic acid described above consists of carbon, hydrogen and oxygen and are free of non-oxygen heteroatoms.

In the heat transfer fluid concentrate, the phosphonocarboxylate can be present in an amount of about 10 to 500 parts per million by weight (ppm), based on the total weight of the heat transfer fluid concentrate. Within this range, the phosphonocarboxylate can be present in an amount greater than or equal to 20 ppm, or, greater than or equal to 40 ppm. Also within this range, the phosphonocarboxylate can be present in an amount less than or equal to 400 ppm, or, less than or equal to 300 ppm.

The heat transfer fluid concentrate may further comprise a phosphinocarboxylate. Phosphinocarboxylates are compounds having the general formula $$H[CHR^1CHR^1]_n\text{—}P(O_2M)\text{-}[CHR^2CHR^2]_mH$$

wherein at least one $R^1$ group in each unit is a COOM, $CH_2OH$, sulphono or phosphono group and the other $R^1$ group which may be the same as, or different from, the first $R^1$ group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, n is an integer equal to or greater than 1, and each M is hydrogen or an alkali metal ion such as a sodium ion, potassium ion and the like. Similarly, at least one $R^2$ group in each unit is a COOM, $CH_2OH$, sulphono or phosphono group and the other $R^2$ group which may be the same as, or different from, the first $R^2$ group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, m is an integer equal to or greater than 0. Furthermore, at least one COOM group will be present in one of the $R^1$ and $R^2$ groups. Exemplary phosphinocarboxylates include phosphinicosuccinic acid and water soluble salts, phosphinicobis(succinic acid) and water soluble salts and phosphinicosuccinic acid oligomer and salts as described in U.S. Pat. Nos. 6,572,789 and U.S. Pat. No. 5,018,577. The phosphonocarboxylates can be a mixture of compounds having the preceding formula with differing values for "n" and "m". The phosphinocarboxylates are separate and different from the carboxylic acids described above.

In the heat transfer fluid concentrate, the phosphinocarboxylate can be present in an amount of about 10 to 500 parts per million by weight (ppm), based on the total weight of the heat transfer fluid concentrate. Within this range, the phosphinocarboxylate can be present in an amount greater than or equal to 20 ppm, or, greater than or equal to 40 ppm. Also within this range, the phosphinocarboxylate can be present in an amount less than or equal to 400 ppm, or, less than or equal to 300 ppm.

The heat transfer fluid concentrate may optionally comprise one or more of an antifoaming agent or defoamer, dispersant, scale inhibitor, surfactant, colorant and other coolant additives.

Exemplary surfactants include fatty acid esters, such as sorbitan fatty acid esters, polyalkylene glycols, polyalkylene glycol esters, copolymers of ethylene oxide (EO) and propylene oxide (PO), polyoxyalkylene derivatives of a sorbitan fatty acid ester, and mixtures thereof. The average molecular weight (MW) of the non-ionic surfactants can be about 55 to about 300,000, or, more specifically about 110 to about 10,000. Suitable sorbitan fatty acid esters include sorbitan monolaurate (e.g., sold under tradename Span® 20, Arlacel® 20, S-MAZ® 20M1), sorbitan monopalmitate (e.g., Span® 40 or Arlacel® 40), sorbitan monostearate (e.g., Span® 60, Arlacel® 60, or S-MAZ® 60K), sorbitan monooleate (e.g., Span® 80 or Arlacel® 80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), sorbitan monotallate (e.g., S-MAZ® 90). Suitable polyalkylene glycols include polyethylene glycols, polypropylene glycols, and mixtures thereof. Examples of polyethylene glycols suitable for use include CARBOWAX™ polyethylene glycols and methoxypolyethylene glycols from Dow Chemical Company, (e.g., CARBOWAX PEG 200, 300, 400, 600, 900, 1000, 1450, 3350, 4000 & 8000, etc.) or PLURACOL® polyethylene glycols from BASF Corp. (e.g., Pluracol® E 200, 300, 400, 600, 1000, 2000, 3350, 4000, 6000 and 8000, etc.). Suitable polyalkylene glycol esters include mono- and di-esters of various fatty acids, such as MAPEG® polyethylene glycol esters from BASF (e.g., MAPEG® 200 ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.). Suitable copolymers of ethylene oxide (EO) and propylene oxide (PO)

include various Pluronic and Pluronic R block copolymer surfactants from BASF, DOWFAX non-ionic surfactants, UCON™ fluids and SYNALOX lubricants from DOW Chemical. Suitable polyoxyalkylene derivatives of a sorbitan fatty acid ester include polyoxyethylene 20 sorbitan monolaurate (e.g., products sold under trademarks TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitant monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K) and the like.

Exemplary antifoam agents include polydimethylsiloxane emulsion based antifoams. They include PC-5450NF from Performance Chemicals, LLC in Boscawen, N.H.; CNC antifoam XD-55 NF and XD-56 from CNC International in Woonsocket in RI. Other antifoams suitable for use in the instant invention include copolymers of ethylene oxide (EO) and propylene oxide (PO), such as Pluronic L-61 from BASF.

Generally, the optional antifoam agents may comprise a silicone, for example, SAG 10 or similar products available from OSI Specialties, Dow Corning or other suppliers; an ethylene oxide-propylene oxide (EO-PO) block copolymer and a propylene oxide-ethylene oxide-propylene oxide (PO-EP-PO) block copolymer (e.g., Pluronic L61, Pluronic L81, or other Pluronic and Pluronic C products); poly(ethylene oxide) or poly(propylene oxide), e.g., PPG 2000 (i.e., polypropylene oxide with an average molecular weight of 2000); a hydrophobic amorphous silica; a polydiorganosiloxane based product (e.g., products containing polydimethylsiloxane (PDMS), and the like); a fatty acids or fatty acid ester (e.g., stearic acid, and the like); a fatty alcohol, an alkoxylated alcohol and a polyglycol; a polyether polyol acetate, a polyether ethoxylated sorbital hexaoleate, and a poly(ethylene oxide-propylene oxide) monoallyl ether acetate; a wax, a naphtha, kerosene and an aromatic oil; and combinations comprising one or more of the foregoing antifoam agents.

The heat transfer fluid concentrate can be diluted, typically with water, to form a heat transfer fluid. For example, the heat transfer fluid concentrate can be diluted by 25 to 75 volume percent to form the heat transfer fluid. In some embodiments, the water used for dilution is deionized water as described in Section 4.5 of ASTM D3306-10.

In the heat transfer fluid the freezing point depressant is present in an amount of 1 wt % to less than 90 wt %, based on the total weight of the heat transfer fluid. Within this range, the amount of the freezing point depressant can be greater than or equal to 30 wt %, greater than or equal to 40 wt %, greater than or equal to 50 wt %, greater than or equal to 55 wt %, greater than or equal to 60 wt %, greater than or equal to 70 wt %, greater than or equal to 75 wt %, greater than or equal to 80 wt %, greater than or equal to 85 wt %, greater than or equal to 86 wt %, greater than or equal to 87 wt %, greater than or equal to 88 wt %, or greater than or equal to 89 wt %, but less than 90 wt % based on the total weight of the heat transfer fluid. Also, within this range, the amount of the freezing point depressant can be less than or equal to 30 wt %, less than or equal to 40 wt %, less than or equal to 50 wt %, less than or equal to 55 wt %, less than or equal to 60 wt %, less than or equal to 70 wt %, less than or equal to 75 wt %, less than or equal to 80 wt %, less than or equal to 85 wt %, less than or equal to 86 wt %, less than or equal to 87 wt %, less than or equal to 88 wt %, or less than or equal to 89 wt %, but more than 1 wt % based on the total weight of the heat transfer fluid.

In the heat transfer fluid, the carboxylate can be present in an amount of about 0.5 to about 8 wt %, based on the total weight of the heat transfer fluid. Within this range, the amount can be greater than or equal to about 0.6 wt %, or, more specifically, greater than or equal to about 0.7 wt %. Also within this range, the amount can be less than or equal to about 7 wt %, or, more specifically, less than or equal to about 6 wt %.

In the heat transfer fluid, the inorganic phosphate can be present in an amount of about 0.05 wt % to about 0.4 weight percent, based on the total weight of the heat transfer fluid. Within this range, the amount can be greater than or equal to about 0.07 wt %, or, more specifically, greater than or equal to about 0.08 wt %. Also within this range, the amount can be less than or equal to about 0.35 wt %, or, more specifically, less than or equal to about 0.30 wt %.

In the heat transfer fluid, the azole compound can be present in an amount of about 0.005 wt % to about 2 wt %, based on the total weight of the heat transfer fluid. Within this range, the azole compound can be present in an amount greater than or equal to about 0.007 wt %, or, more specifically, greater than or equal to about 0.01 wt %. Also within this range, the azole compound can be present in an amount less than or equal to about 1.5 wt %, or, more specifically, less than or equal to about 1 wt %.

The lithium compound can be present in an amount such that the heat transfer fluid has a lithium ion concentration of 25 to 1600 parts per million by weight (ppm) of the heat transfer fluid. Within this range the lithium ion concentration can be less than or equal to about 1500 ppm, or more specifically, less than or equal to about 1400 ppm. Also within this range the lithium ion concentration can be greater than or equal to about 25 ppm, or more specifically, greater than or equal to about 30 ppm.

In the heat transfer fluid, the magnesium compound can be present in an amount such that the heat transfer fluid has a magnesium ion concentration of 2 to 60 parts per million by weight (ppm) of the heat transfer fluid. Within this range, the magnesium ion concentration can be greater than or equal to about 4 ppm, or, more specifically, greater than or equal to about 6 ppm. Also within this range, the magnesium ion concentration can be less than or equal to about 65 ppm, or, more specifically, less than or equal to about 60 ppm.

The heat transfer fluid additionally comprises water. Water suitable for use includes deionized water or de-mineralized water. The water may be used in an amount of about 1 wt % to about 98 wt %, based on the total weight of the heat transfer fluid. Within this range, water can be present in an amount greater than or equal to 3 wt %, or, more specifically, greater than or equal to 5 wt %. Also within this range, water can be present in an amount less than or equal to 70 wt %, or, more specifically, less than or equal to 60 wt %.

The calcium compound can be present in an amount such that the heat transfer fluid has a calcium ion concentration of greater than 0.5 parts per million, based on the total weight of the heat transfer fluid. Within this range, the amount of calcium ions can be less than 60 ppm. Also within this range, the amount of calcium ions can be less than or equal to 40 ppm.

The pH of the heat transfer fluid is 7.0 to 9.5 at room temperature. Within this range, the pH can be greater than or equal to 7.5, or, greater than or equal to 7.8. Also within this range, the pH can be less than or equal to 9.0, or, less than or equal to 8.8.

In the heat transfer fluid, the phosphonocarboxylate can be present in an amount of about 10 to 500 ppm, based on the total weight of the heat transfer fluid. Within this range, the phosphonocarboxylate can be present in an amount greater than or equal to 20 ppm, or, greater than or equal to 40 ppm. Also within this range, the phosphonocarboxylate can be present in an amount less than or equal to 400 ppm, or, less than or equal to 300 ppm.

containing 100 ppm chloride. The lithium acetate was added in increments to the existing solution. For example 7 magnesium acetate was added to the solution used in example 6. Results are shown in Table 2.

TABLE 2

| | Li Acetate dihydrate Concentration mg/L | Calculated Li Concentration mg/L | Calculated Mg Concentration mg/L | Al 319 Corrosion Rate mpy | Ecorr V/AgAgCl | Rp Ohms/cm^2 |
|---|---|---|---|---|---|---|
| 1 | 0.0 | 0 | 0.0 | 11.9 | −0.968 | 1839 |
| 2 | 266.7 | 18.1 | 0.0 | 10.7 | −0.931 | 2001 |
| 3 | 533.3 | 36.3 | 0.0 | 8.9 | −0.847 | 2410 |
| 4 | 800.0 | 54.4 | 0.0 | 7.6 | −0.822 | 2831 |
| 5 | 1066.7 | 72.6 | 0.0 | 7.3 | −0.810 | 2958 |
| 6 | 1333.3 | 90.7 | 0.0 | 6.0 | −0.788 | 3586 |
| 7 | 1333.3 | 90.7 | 5.7 | 2.3 | −0.464 | 9418 |

In the heat transfer fluid, the phosphinocarboxylate can be present in an amount of about 10 ppm to 500 ppm, based on the total weight of the heat transfer fluid. Within this range, the phosphinocarboxylate can be present in an amount greater than or equal to 20 ppm, or, greater than or equal to 40 ppm. Also within this range, the phosphinocarboxylate can be present in an amount less than or equal to 400 ppm, or, less than or equal to 300 ppm.

It is also contemplated that in some applications, such as heavy duty engines, it may be desirable to incorporate one or more additional corrosion inhibitors such as nitrites, molybdates, and salts thereof.

A method of preventing corrosion comprises contacting a heat transfer fluid as described herein with a heat transfer system. The heat transfer system can comprise components made by controlled atmosphere brazing. The heat transfer system may comprise aluminum.

The heat transfer fluid is further demonstrated by the following non-limiting examples.

EXAMPLES

The examples were made using a base heat transfer fluid as shown in Table 1. Amounts are in weight percent based on the total weight of the fluid.

TABLE 1

| Component | Description | Amount |
|---|---|---|
| Ethylene glycol | Freezing point depressant | 92.38 |
| 50 wt % solution of sodium tolyltriazole | Azole compound | 0.47 |
| 50 wt % solution of sodium hydroxide | pH adjusting agent | 2.57 |
| Neodecanoic acid | Carboxylic acid | 0.95 |
| 2-ethyl hexanoic acid | Carboxylic acid | 2.85 |
| PM-5150 | Antifoam | 0.19 |
| 75 wt % solution of $H_3PO_4$ | Inorganic phosphate | 0.49 |
| AR-940 | 40 wt % solution of sodium polyacrylate | 0.07 |

The above disclosed base heat transfer fluid was combined with varying amounts of lithium acetate or a combination of lithium acetate and magnesium acetate for examples 1-17. These examples were tested for aluminum corrosion protection using a modified GM9066P test. The electrode was sand cast aluminum 319 with a surface area of 5.3 square centimeters. The electrode had a surface temperature of 128+/−2 degrees C. The test solution had a temperature of 102+/− degrees C. The test solution was a 25% by volume solution The data shows that with each addition of lithium ions the corrosion rate decreases. The examples having lithium and magnesium show an even more surprising decrease in corrosion rate.

The above disclosed base heat transfer fluid was combined with varying amounts of lithium benzoate for examples 18-32. These examples were tested for aluminum corrosion protection using a modified GM9066P test. The electrode was sand cast aluminum 319 with a surface area of 5.3 square centimeters. The electrode had a surface temperature of 128+/−2 degrees C. The test solution had a temperature of 102+/− degrees C. The test solution was a 25% by volume solution containing 100 ppm chloride. The lithium benzoate was added in increments to the existing solution. Results are shown in Table 3.

TABLE 3

| Li Benzoate Concentration mg/L | Calculated Li Concentration mg/L | Corrosion Rate mpy | Ecorr V/AgAgCl | Rp Ohms/cm^2 |
|---|---|---|---|---|
| 8 | 0 | 0 | 7.95 | −0.981 | 2698.9 |
| 20 | 600 | 33 | 7.30 | −0.960 | 2941 |
| 22 | 1200 | 65 | 7.36 | −0.927 | 2917.3 |
| 24 | 2400 | 130 | 7.20 | −0.927 | 2978.2 |
| 27 | 5000 | 271 | 2.32 | −0.806 | 9263.5 |

Similar to the results shown above, the addition of lithium ions decreases the corrosion rate.

The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The various embodiments and ranges described herein are combinable to the extent that the description is not contradictory.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

The invention claimed is:

1. A method of preventing corrosion comprising contacting a heat transfer system with a heat transfer fluid comprising:

a) a freezing point depressant;
b) 25 to 1600 ppm lithium ions; and
c) a carboxylate;
wherein the heat transfer fluid has a pH of 7 to 9.5 and is free of silicate, borate and amines; and
wherein the heat transfer fluid is free of lithium molybdate.

2. The method of claim 1, wherein the heat transfer system comprises a component made by controlled atmosphere brazing.

3. The method of claim 1, wherein the heat transfer system comprises aluminum.

4. The method of claim 1, wherein the heat transfer fluid further comprises less than 60 ppm calcium ions.

5. The method of claim 1, wherein the heat transfer fluid further comprises less than 40 ppm calcium ions.

6. The method of claim 1, wherein the heat transfer fluid further comprises magnesium ions.

7. The method of claim 6, wherein the magnesium ions are about 2 to about 60 ppm.

8. The method of claim 1, wherein the heat transfer fluid further comprises 300 to 900 ppm of an acrylate based polymer.

9. The method of claim 8, wherein the acrylate based polymer is a water soluble polymer.

10. The method of claim 8, wherein the acrylate based polymer comprises a phosphinopolyacrylate.

11. The method of claim 1, wherein the heat transfer fluid comprises about 0.5 to about 8 wt % carboxylate, based on the total weight of the heat transfer fluid.

12. The method of claim 1, wherein the heat transfer fluid further comprises an inorganic phosphate.

13. The method of claim 12, wherein the heat transfer fluid comprises about 0.05 to about 0.4 wt % inorganic phosphate, based on the total weight of the heat transfer fluid.

14. The method of claim 12, wherein the inorganic phosphate comprises phosphoric acid, sodium orthophosphate, potassium orthophosphate, sodium pyrophosphate, potassium pyrophosphate, sodium polyphosphate, potassium polyphosphate, sodium hexametaphosphate, potassium hexametaphosphate, or a combination thereof.

15. The method of claim 1, wherein the heat transfer fluid further comprises an azole compound.

16. The method of claim 15, wherein the azole compound comprises benzotriazole, tolyltriazole, methyl benzotriazole, tetrandryotolyltriazole, butyl benzotriazole, mercaptobenzothiazole, thiazole, a substituted thiazoles, imidazole, benzimidazole, a substituted imidazole, indazole, a substituted indazole, tetrazole, a substituted tetrazole, or a combination thereof.

17. The method of claim 15, wherein the heat transfer fluid comprises about 0.005 to about 2 wt % azole compound, based on the total weight of the heat transfer fluid.

18. The method of claim 1, wherein the freezing point depressant comprises an alcohol or mixture of alcohols.

19. The method of claim 18, wherein the alcohol or mixture of alcohols comprises monohydric alcohol, polyhydric alcohol, or mixtures thereof.

20. The method of claim 18, wherein the alcohol is selected from the group consisting of methanol; ethanol; propanol; butanol; ethoxylated furfuryl alcohol; ethylene glycol; propylene glycol; 1,3-propanediol; glycerol; diethylene glycol; triethylene glycol; 1,2-propylene glycol; 1,3-propylene glycol; dipropylene glycol; butylene glycol; glycerol-1,2-dimethyl ether; glycerol-1,3-dimethyl ether; monoethylether of glycerol; 1,2,6 -hexanetriol; trimethylopropane; methoxyethanol; and a combination thereof.

21. The method of claim 1, wherein the heat transfer fluid comprises about 1 to about 90 wt % freezing point depressant, based on the total weight of the heat transfer fluid.

22. The method of claim 1, wherein the lithium ions are about 25 to about 1500 ppm.

23. The method of claim 1, wherein the lithium ions are about 25 to about 1400 ppm.

24. The method of claim 1, wherein the heat transfer fluid further comprises water.

25. A method of preventing corrosion comprising contacting a heat transfer system with a heat transfer fluid comprising:
a) freezing point depressant;
b) water;
c) 25 to 1600 ppm lithium ions;
d) a carboxylate;
e) an inorganic phosphate;
f) an azole compound; and
g) 400 to 1000 ppm of an acrylate based polymer;
wherein the heat transfer fluid has a pH of 7 to 9.5 and is free of silicate, borate and amines; and
wherein the heat transfer fluid is free of lithium molybdate.

* * * * *